(12) United States Patent
Karan

(10) Patent No.: US 10,807,340 B2
(45) Date of Patent: Oct. 20, 2020

(54) LABEL WEB WITH MULTIPLE SIDE-BY-SIDE LABELS

(71) Applicant: KENCO© LABEL & TAG CO., LLC, Milwaukee, WI (US)

(72) Inventor: Aharon A. Karan, Milwaukee, WI (US)

(*) Notice: Subject to any disclaimer, the term of this patent is extended or adjusted under 35 U.S.C. 154(b) by 0 days.

(21) Appl. No.: 16/173,828

(22) Filed: Oct. 29, 2018

(65) Prior Publication Data
US 2019/0126583 A1 May 2, 2019

Related U.S. Application Data

(60) Provisional application No. 62/578,027, filed on Oct. 27, 2017.

(51) Int. Cl.
| | | |
|---|---|---|
| *G09F 3/10* | (2006.01) | |
| *B31D 1/02* | (2006.01) | |
| *G09F 3/02* | (2006.01) | |

(52) U.S. Cl.
CPC ............. *B31D 1/021* (2013.01); *B31D 1/026* (2013.01); *B31D 1/027* (2013.01); *G09F 3/02* (2013.01); *G09F 3/10* (2013.01); *B32B 2519/00* (2013.01); *G09F 2003/0201* (2013.01); *G09F 2003/0208* (2013.01); *G09F 2003/0229* (2013.01); *G09F 2003/0267* (2013.01)

(58) Field of Classification Search
CPC ........ B31D 1/021; B31D 1/026; B31D 1/027; G09F 3/10; G09F 3/02; G09F 2003/0229; G09F 2003/0267; G09F 2003/0201; G09F 2003/0208; B32B 2519/00
See application file for complete search history.

(56) References Cited

U.S. PATENT DOCUMENTS

| | | | | |
|---|---|---|---|---|
| 5,348,780 | A * | 9/1994 | Boggs ................... | G09F 3/0288 281/2 |
| 5,846,624 | A * | 12/1998 | Denklau ................... | G09F 3/10 428/42.3 |
| 7,475,912 | B1 * | 1/2009 | Reffett ..................... | B32B 7/06 283/101 |
| 2004/0222625 | A1 * | 11/2004 | Major ................... | G09F 3/0288 283/81 |
| 2008/0107466 | A1 * | 5/2008 | Craig ..................... | B41J 11/009 400/582 |
| 2012/0284184 | A1 * | 11/2012 | McGivney .............. | G07F 17/26 705/43 |

* cited by examiner

*Primary Examiner* — Cassandra Davis
(74) *Attorney, Agent, or Firm* — Boyle Fredrickson, S.C.

(57) ABSTRACT

A label web including a substrate is provided. The label web includes a first label removably affixed to a first side of the substrate. The first label is fabricated from a first material. A second label is removably affixed to the first side of the substrate adjacent to the first label in a side-by-side relationship. The second label is fabricated from a second material which differs from the first material. The first labels may be utilized to print desired information thereon and the second labels may fabricated from a transparent, protective material coating which may positioned on the first labels to discourage damage to the first labels from exposure to water or handling when the first labels are affixed to corresponding products.

10 Claims, 3 Drawing Sheets

LABEL WEB WITH MULTIPLE SIDE-BY-SIDE LABELS

CROSS-REFERENCE TO RELATED APPLICATIONS

This application claims priority of U.S. Provisional Patent Application Ser. No. 62/578,027, filed on Oct. 27, 2017, the content of which is incorporated herein by reference in its entirety as if fully set forth herein.

FIELD OF THE INVENTION

This invention relates generally to a labels for inkjet printers, and in particular, to a label web having multiple side-by-side labels thereon which are fabricated from different materials wherein a first of the side-by-side labels may be utilized to print desired information thereon and a second of the side-by-side labels may fabricated from a transparent, protective material coating which may positioned on the first of the side-by-side labels to discourage damage to the first of the side-by-side labels from exposure to water, handling or the like.

BACKGROUND AND SUMMARY OF THE INVENTION

As is known, inkjet printing is a non-impact printing technique in which droplets of ink are ejected through fine nozzles or orifices in a printhead onto a substrate, such a web of stock material, without bringing the nozzles into contact with the substrate. The ink droplets land on the substrate thereby printing user-desired information thereon. For higher quality, higher resolution printing applications, the number of orifices in the printhead is increased and the diameter of such orifices is reduced in size. Consequently, for full color printed images, inks have been developed that include dyes and/or pigments and various carriers and/or solvents which are resistant to drying or otherwise clogging the orifices in the printhead. These modified inks require longer drying times and/or are prone to color mixing or bleeding, thereby resulting in poorer quality images. Further, in order to increase the absorption of the ink into the substrate on which the ink is deposited, inkjet inks tend to be water-based. While the use of water-based inks improves the absorption of the ink into the substrate, these types of inks have a tendency to run or smudge on the surface of the substrate if exposed to water or handled. As a result, the use of inkjet printers has been limited to certain applications wherein the substrate is not exposed to water or handled.

Further, in order to limit the color mixing or bleeding associated with these modified ink formulations, specialty papers incorporating exotic coatings have been developed. These specialty papers are fabricated using conventional paper making techniques wherein a fibrous pulp is deposited on a wire screen and dried to form a web. The web includes minute pores or voids between the cellulosic fibers for absorption of liquids therein. The coating is depositing on the web to change the porosity and the hydrophilic properties of the web. As a result, the coated web has the ability to absorb or repel aqueous and/or organic fluids which may be used as carrier fluids in the ink formulations.

Heretofore, inkjet label printers have been developed that allow a user to print information, such as bar codes, on coated, adhesive backed labels. More specifically, blank adhesive labels are carried on a flexible web from a supply roll that is fed through the ink jet label printer wherein the desired information is printed thereon. In addition to the labels and the ink being inexpensive, the inkjet printing process is very efficient, thereby allowing a user to quickly and easily print a desired quantity of labels. Unfortunately, as previously described, the use of labels having inject printing thereon has been limited to certain applications wherein the label is not exposed to water or handled. In view of the foregoing, it can be appreciated that overcoming the limitations associated with prior labels having inject printing thereon would be highly desirable.

Therefore, it is the primary object and feature of the present invention to provide a flexible web of a substrate having multiple side-by-side labels provided thereon.

It is a further object and feature of the present invention to provide a flexible web of a substrate having multiple side-by-side labels provided thereon which are fabricated from different materials.

It is a still further object and feature of the present invention to provide a flexible web of a substrate having multiple side-by-side labels provided thereon wherein a first of the side-by-side labels may be utilized to print desired information thereon and a second of the side-by-side labels may fabricated from a protective coating which may positioned on the first of the side-by-side labels to prevent damage to the first of the side-by-side labels from exposure to water or handling.

In accordance with the present invention, a label web including a substrate is provided. The label web includes a first label removably affixed to a first side of the substrate. The first label is fabricated from a first material. A second label is removably affixed to the first side of the substrate adjacent to the first label in a side-by-side relationship. The second label is fabricated from a second material which differs from the first material.

An adhesive is disposed on the first side of the substrate between the first label and the first side of the substrate and between the second label and the first side of the substrate. The first and second labels have a common configuration. The substrate has first and second edges. The web of base material further includes a web of the first material laminated to the first side of the substrate adjacent the first edge and a web of the second material laminated to the first side of the substrate adjacent the second edge. The first label is defined by a first plurality of perforations die cut into the web of the first material and the second label is defined by a second plurality of perforations die cut into the web of the second material.

The substrate includes an upstream end interconnecting the first and second edges. The first label includes an upstream edge generally parallel and adjacent to the upstream end of the substrate and a downstream edge. The second label includes an upstream edge generally parallel and adjacent to the upstream end of the substrate and a downstream edge. A third label is removably affixed to a first side of the substrate spaced downstream of the downstream edge of the first label. The third label is fabricated from the first material. A fourth label is removably affixed to the first side of the substrate adjacent to the third label in a side-by-side relationship and downstream of the downstream edge of the second label. The fourth label is fabricated from the second material. The spacing between the third label and the downstream edge of the first label defines a registration mark therebetween.

In accordance with a further aspect of the present invention, a label web including a substrate is provided. The label web includes a web of a first material laminated to a first side of the substrate adjacent a first edge of the substrate. A web of a second material is laminated to the first side of the substrate adjacent a second edge of the substrate. A first perforation is die cut into the web of the first material. The first perforation defines a first label removably affixed to the first side of the substrate. A second perforation is die cut into the web of the second material. The second perforation defines a second label removably affixed to the first side of the substrate.

An adhesive is disposed on the first side of the substrate between the first label and the first side of the substrate and between the second label and the first side of the substrate. The first and second labels have a common configuration. The first and second edges of the substrate are generally parallel and wherein the web of the first material is adjacent to the web of the second material. The first perforation is one of a first plurality of perforations die cut into the web of the first material and defines the first label. The second perforation is one of a second plurality of perforations die cut into the web of the second material and defines the second label.

The substrate includes an upstream end interconnecting the first and second edges. The first label includes an upstream edge generally parallel and adjacent to the upstream end of the substrate and a downstream edge. The second label includes an upstream edge generally parallel and adjacent to the upstream end of the substrate and a downstream edge. A third perforation is die cut into the web of the first material. The third perforation defines a third label removably affixed to the first side of the substrate. A fourth perforation is die cut into the web of the second material. The fourth perforation defines a fourth label removably affixed to the first side of the substrate. The spacing between the third label and the downstream edge of the first label defines a registration mark therebetween.

In accordance with a still further aspect of the present invention, a method of affixing indicia on a product is provided. The method includes the step of removably affixing a first label to a first side of a substrate. The first label is fabricated from a first material and has indicia provided thereon. A second label is removably affixed to the first side of the substrate adjacent to the first label in a side-by-side relationship. The second label is fabricated from a second, generally transparent material which differs from the first material. The first label is removed from the first side of the substrate and affixed to the product. The second label is removed from the first side of the substrate and affixed to first label so as to overlap the first label.

An adhesive is deposited on the first side of the substrate between the first label and the first side of the substrate and between the second label and the first side of the substrate. It is contemplated for the first and second labels have a common configuration. The substrate has first and second edges. The first label is removably affixed to the first side of the substrate adjacent the first edge and the second label is removably affixed to the first side of the substrate adjacent the second edge.

The substrate includes an upstream end interconnecting the first and second edges. The first label includes an upstream edge generally parallel and adjacent to the upstream end of substrate and a downstream edge. The second label includes an upstream edge generally parallel and adjacent to the upstream end of substrate and a downstream edge. A third label is removably affixed to the first side of a substrate. The third label is fabricated from the first material and has indicia provided thereon. A fourth label is removably affixed to the first side of the substrate adjacent to the third label in a side-by-side relationship. The fourth label is fabricated from the second material. The spacing between the third label and the downstream edge of the first label defines a registration mark therebetween.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
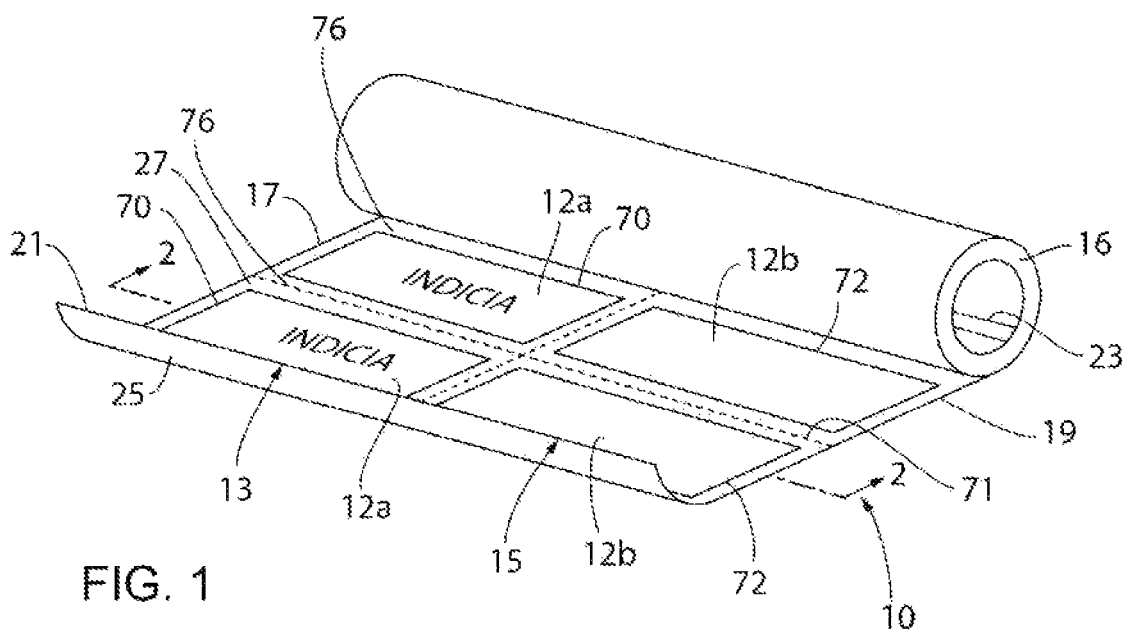
FIG. 1 is an isometric view of a label web in accordance with present invention.
Figure 4:
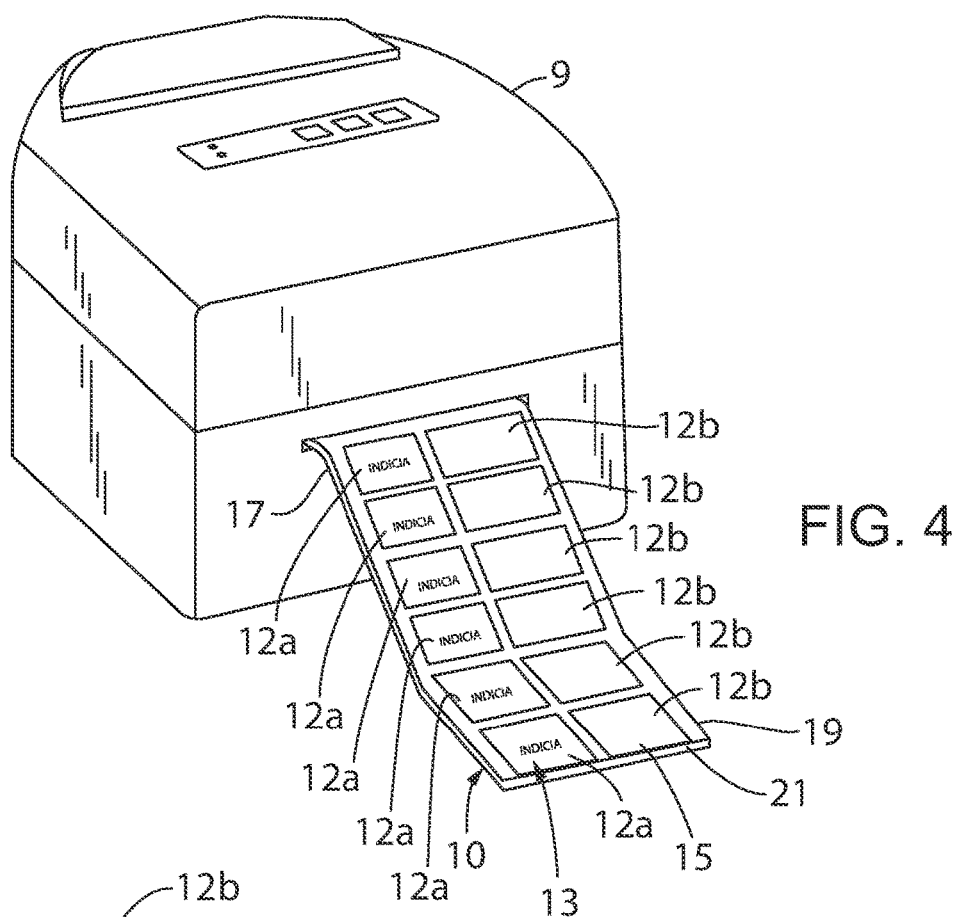
FIG. 4 is a schematic, isometric view showing the printing of the label web of the present invention with a convention inkjet printer.

Referring to FIG. 1, a label web in accordance with is present invention is generally designated by the reference numeral 10. It is intended for label web 10 to be used in combination with a conventional ink jet printer 9, FIG. 4, so as to allow indicia 11 to be printed on first labels 12a of first label set 13 of label web 10, as hereinafter described. Label web 10 is defined by first and second spaced edges 17 and 19, respectively, an upstream end 21, and a downstream end 23. It is contemplated for upstream end 21 of label web 10 to interconnect and be generally perpendicular to first and second edges 17 and 19, respectively. Label web 10 further includes a lower surface 25 and an upper surface 27. In the depicted embodiment, label web 20 has a generally rectangular configuration. However, other configurations are possible without deviating from the scope of the present invention. Label web 10 may be stored as a roll 16 formed by winding label web 10 around a tube or by turning label web 10 over on itself. Alternatively, it can be appreciated that label web 10 may be provided to a user on rectangular sheets.

Figure 2:
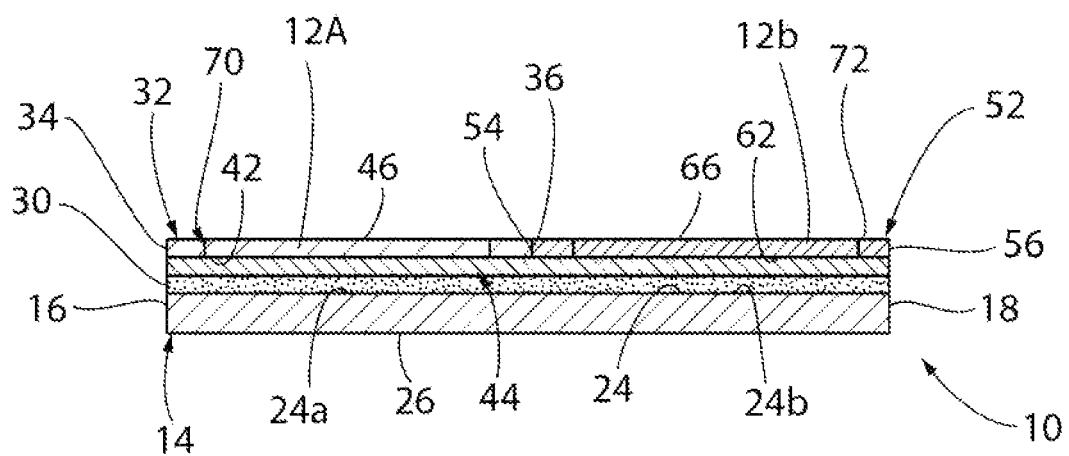
FIG. 2 is a cross-sectional view of the label web of the present invention taken along line 2-2 of FIG. 1.
Figure 3:
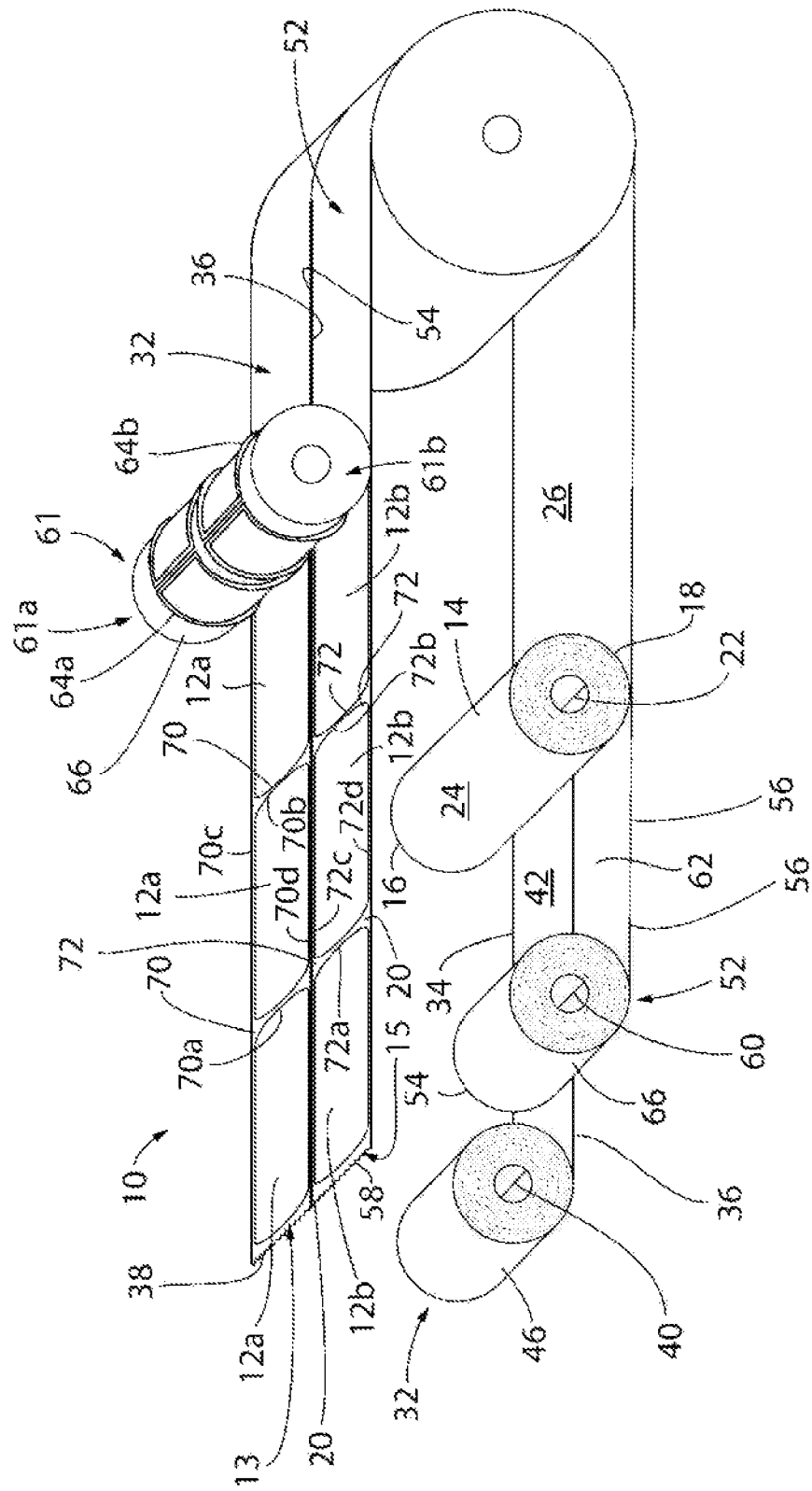
FIG. 3 is a schematic, isometric view showing the fabrication of the label web of the present invention.

Referring to FIGS. 2 and 3, label web 10 is fabricated from a plurality of layers. More specifically, label web 10 includes substrate 14 formed from a liner material that enables label web 10 to be fed seamlessly through inkjet printer 9. Substrate 14 is defined by first and second spaced edges 16 and 18, respectively, an upstream end 20, and a downstream end 22. It is contemplated for upstream end 20 of label web 10 to interconnect and be generally perpendicular to first and second edges 16 and 18, respectively, of substrate 14. In the depicted embodiment, substrate 14 has a generally rectangular configuration. However, other configurations are possible without deviating from the scope of the present invention.

Substrate 14 further includes an inner surface 24 and an outer surface 26. Inner surface 24 of substrate 14 may be divided into a first portion 24a adjacent first edge 16 of substrate 14 and a second portion 24b adjacent to second edge 18 of inner surface 24. In the depicted embodiment, first portion 24a of inner surface 24 of substrate 14 has a surface area approximately equal to the surface area of second portion 24a of inner surface 24 of substrate 14.

However, first and second portions 24a and 24b, respectively, of inner surface 24 of substrate 14 may have other configurations without deviating from the scope of the present invention. Silicone 30 or other non-binding material, e.g., wax or Teflon, is deposited on first and second portions 24a and 24b, respectively, of inner surface 24 of substrate 14. Silicone 30 prevents substrate 14 from becoming permanently bonded to adhesive 44, as hereinafter described.

Label web 10 further includes a web 32 of a first material laminated on first portion 24a of inner surface 24 of substrate 14, FIG. 3. It is contemplated for the first material to be a specialty paper designed for use in conjunction with conventional inkjet printer 9. Web 32 has first and second edges 34 and 36, respectively, an upstream end 38 and a downstream end 40. Web 32 further includes an inner surface 42 having an adhesive 44 provided thereon and an outer surface 46. Outer surface 46 of web 32 is a printable surface so as to allow a user to print desired information/indicia 11 thereon. With web 32 of the first material laminated on first portion 24a of inner surface 24 of substrate 14, first edge 34 of web 32 is aligned with first edge 16 of substrate 14, upstream end 38 of web 32 is aligned with upstream end 20 of substrate 14, and downstream end 40 of web 32 is aligned with downstream end 22 of substrate 14.

Label web 10 further includes a web 52 of a second material laminated on second portion 24b of inner surface 24 of substrate 14, FIG. 3. It is contemplated for the second material to be a transparent, protective material for use in conjunction with a conventional inkjet printer 9. However, web 52 may be fabricated from other materials without deviating from the scope of the present invention. Web 52 has first and second edges 54 and 56, respectively, an upstream end 58 and a downstream end 60. Web 52 further includes an inner surface 62 having adhesive 44 provided thereon and an outer surface 66. With web 52 of the second material laminated on second portion 24b of inner surface 24 of substrate 14, first edge 54 of web 52 abuts second edge 36 of web 32 of the first material laminated on first portion 24a of inner surface 24 of substrate 14, second edge 56 of web 52 is aligned with second edge 18 of substrate 14, upstream end 58 of web 52 is aligned with upstream end 20 of substrate 14, and downstream end 60 of web 52 is aligned with downstream end 22 of substrate 14.

Once webs 32 and 52 of the first and second materials are laminated to inner surface 24 of substrate 14, label web 20 passes through rotary die cutter 61. Die cutter 61 includes a plurality of pairs of dies 64a and 64b circumferentially spaced about outer surface 66 of die cutter 62. The pairs of dies 64a and 64b are provided in side-by-side relationship between opposite ends 61a and 61b of die cutter 61. Each die 64a circumferentially spaced about outer surface 66 of die cutter 61 corresponds in size and shape to first labels 12a of first label set 13 to be die cut in web 32 of label web 10. Similarly, each die 64b circumferentially spaced about outer surface 66 of die cutter 61 corresponds in size and shape to second labels 12b of second label set 15 to be die cut in web 52 of label web 10. In the depicted embodiment, it is intended for the size and shape of first labels 12a and second labels 12b be to substantially identical. However, it can be understood that the configurations of dies 64a and 64b, and hence of first labels 12a and second labels 12b, may be different without deviating from the scope of the present invention.

As label web 10 passes between die cutter 61 and a hardened anvil roll or plate (not shown), dies 64a and 64b provide corresponding perforations or cut lines 70 and 72, respectively, in webs 32 and 52 of label web 10. In can be appreciated that cut lines 70 define first labels 12a of first label set 13 in label web 10 and cut lines 72 define second labels 12b of second label set 15 in label web 10, wherein each first label 12a is positioned in a side-by-side relationship with a corresponding second label 12b of second label set 15. Each cut line 70 includes an upstream portion 70a generally parallel to upstream end 21 of label web 10, a downstream portion 70b generally parallel and spaced from upstream portion 70a, and first and second side portions 70c and 70d, respectively, generally perpendicular to upstream and downstream portions 70c and 70d, respectively. Similarly, each cut line 72 includes an upstream portion 72a generally parallel to upstream end 21 of label web 10, a downstream portion 72b generally parallel and spaced from upstream portion 72a, and first and second side portions 72c and 72d, respectively, generally perpendicular to upstream and downstream portions 72c and 72d, respectively. As best seen in FIG. 1, it is further contemplated to die cut perforations 71 through label web 10 between the first and second edges 17 and 19, respectively, thereof. Perforations 71 extend along an axis generally parallel to upstream end 21 of label 20 and allow for a user to separate a desired portion of label web 10 from roll 16.

The spacing between adjacent first labels 12a of first label set 13 of label web 10 and/or the spacing between adjacent second labels 12b of second label set 15 of label web 10 may define registration marks 76 in label web 10. It is intended for registration marks 76 to be used to orientate label web 10 within an inkjet printer 9 so as to insure first labels 12a of first label set 13 are properly aligned within inkjet printer 9 for printing thereon. Alternatively, it can be appreciated that registration marks 76 may have other configurations without deviating from the scope of the present invention. For example, registration marks 76 may be comprised of printed marks provided on the spacing between adjacent first labels 12a of first label set 13 of label web 10 and/or the spacing between adjacent second labels 12b of second label set 15 of label web 10. For example, registration marks 76 may take the form of spaced stripes extending between first and second edges 17 and 19, respectively, of label web 20.

In operation, a user positions upstream end 21 of label web 10 within the input of a conventional inkjet printer 9. As label web 10 is fed through the inkjet printer 9, user desired indicia 11 is printed on first labels 12a of first label set 13 of label web 10, FIG. 4. As previously noted, registration marks 76 between adjacent first labels 12a of first label set 13 in label web 10 and/or the spacing between adjacent second labels 12b of second label set 15 in label web 10 orientates label web 10 within the inkjet printer 9 so as to insure each indicia 11 is properly aligned on a corresponding label 12a of first label set 13 between adjacent registration marks 76. Once the printing operation has been completed, label web 10 may be rolled onto itself to form the roll of printed labels 16.

Figure 5:
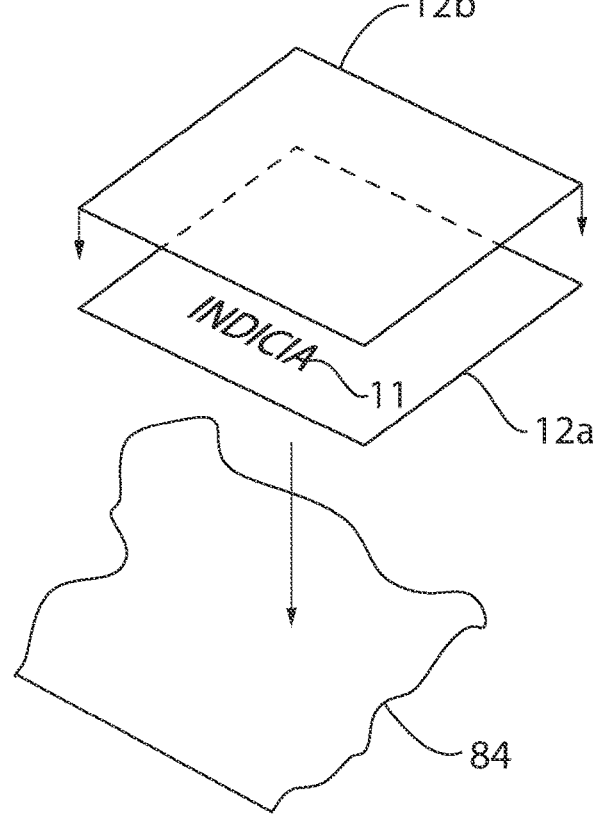
FIG. 5 is an exploded, isometric view showing the affixing of first and second labels from the label web of the present invention on a product.

Referring to FIG. 5, once a roll of printed labels 16 has been completed, a user may remove a first of first label 12a of first label set 13 from label web 10 along cut line 70. It can be understood that silicone 30 deposited on first portion 24a of inner surface 24 of substrate 14 allows for first labels 12a of first label set 13 to be removed from label web 10 along cut lines 70. Utilizing the adhesive 44 provided on inner surface 42 of web 32, the removed first label 12a may be affixed to a selected item or product 84 at a desired location. Thereafter, a user may remove a first of second labels 12b of second label set 15 formerly in a side-by-side relationship with the removed first label 12a from label web 10 along cut line 72. It can be understood that silicone 30 deposited on second portion 24*b* of inner surface 24 of substrate 14 allows for second label 12*b* of second label set 15 to be removed from label web 10 along cut lines 72. Utilizing the adhesive 44 provided on inner surface 62 of web 52, the removed second label 12*b* may be positioned over and affixed to first label 12*a*. As previously described, the removed second label 12*b* of second label set 15 is transparent and fabricated from a protective material such that a user may still see and/or read indicia 11 on the first label 12*a* affixed to product 84. Further, the protective properties of the second material from which second label 12*b* is fabricated discourage damage to first label to first label 12*a* from exposure to water, handling or the like.

It can be appreciated that the above description of a label web is merely exemplary of the present invention. Various modes of carrying out the invention are contemplated as being within the scope of the following claims particularly pointing out and distinctly claiming the subject matter, which is regarded as the invention.

I claim:

1. A label web including a substrate, comprising:
   a first label removably affixed to a first side of the substrate, the first label fabricated from a first material; and
   a second label removably affixed to the first side of the substrate adjacent to the first label in a side-by-side relationship, the second label fabricated from a second material which differs from the first material;
   wherein:
   the substrate includes an upstream end;
   the first label includes an upstream edge generally parallel and adjacent to the upstream end of the substrate and a downsteam edge;
   the second label includes an upstream edge generally parallel and adjacent to the upstream end of the substrate and a downstream edge;
   a third label is removably affixed to a first side of the substrate spaced downstream of the downstream edge of the first label, the third label fabricated from the first material;
   a fourth label is removably affixed to the first side of the substrate adjacent to the third label in a side-by-side relationship and downstream of the downstream edge of the second label, the fourth label fabricated from the second material; and
   the spacing between the third label and the downstream edge of the first label defines a registration mark therebetween.

2. The label web of claim 1 further comprising an adhesive disposed on the first side of the substrate between the first label and the first side of the substrate and between the second label and the first side of the substrate.

3. The label web of claim 1 wherein the first label has a configuration and the second label has a configuration, the configuration of the first label being the same as the configuration of the second label.

4. The label web of claim 1 wherein the substrate has first and second edges and wherein the label web further includes:
   a web of the first material laminated to the first side of the substrate adjacent the first edge; and
   a web of the second material laminated to the first side of the substrate adjacent the second edge.

5. The label web of claim 4 wherein the first label is defined by a first plurality of perforations die cut into the web of the first material and wherein the second label is defined by a second plurality of perforations die cut into the web of the second material.

6. A label web including a substrate, comprising:
   a web of a first material laminated to a first side of the substrate adjacent a first edge of the substrate;
   a web of a second material laminated to the first side of the substrate adjacent a second edge of the substrate;
   a first perforation die cut into the web of the first material, the first perforation defining a first label removably affixed to the first side of the substrate; and
   a second perforation die cut into the web of the second material, the second perforation defining a second label removably affixed to the first side of the substrate;
   wherein:
   the substrate includes an upstream end interconnecting the first and second edges;
   the first label includes an upstream edge generally parallel and adjacent to the upstream end of the substrate and a downsteam edge;
   the second label includes an upstream edge generally parallel and adjacent to the upstream end of the substrate and a downstream edge;
   a third perforation is die cut into the web of the first material, the third perforation defining a third label removably affixed to the first side of the substrate;
   a fourth perforation is die cut into the web of the second material, the fourth perforation defining a fourth label removably affixed to the first side of the substrate; and
   the spacing between the third label and the downstream edge of the first label defines a registration mark therebetween.

7. The label web of claim 6 further comprising an adhesive disposed on the first side of the substrate between the first label and the first side of the substrate and between the second label and the first side of the substrate.

8. The label web of claim 6 wherein the first label has a configuration and the second label has labels have a common configuration, the configuration of the first label being the same as the configuration of the second label.

9. The label web of claim 6 wherein the first and second edges of the substrate are generally parallel and wherein the web of the first material is adjacent to the web of the second material.

10. The label web of claim 6 wherein the first perforation is one of a first plurality of perforations die cut into the web of the first material and defining the first label and wherein the second perforation is one of a second plurality of perforations die cut into the web of the second material and defining the second label.

\* \* \* \* \*